(12) United States Patent
Bejerano et al.

(10) Patent No.: US 9,066,195 B2
(45) Date of Patent: Jun. 23, 2015

(54) METHOD AND APPARATUS FOR NEIGHBOR DISCOVERY

(75) Inventors: Yigal Bejerano, Springfield, NJ (US);
Katherine Guo, Scotch Plains, NJ (US);
Thyagarajan Nandagopal, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 401 days.

(21) Appl. No.: 13/247,178

(22) Filed: Sep. 28, 2011

(65) Prior Publication Data

US 2013/0077525 A1    Mar. 28, 2013

(51) Int. Cl.
*H04L 12/28*    (2006.01)
*H04W 8/00*    (2009.01)

(52) U.S. Cl.
CPC ..................... *H04W 8/005* (2013.01)

(58) Field of Classification Search
USPC ......... 370/203, 204–215, 229–240, 310–394, 370/395.1, 395.3, 395.4, 395.41, 395.42, 370/395.5, 395.52, 431–529
See application file for complete search history.

(56) References Cited

U.S. PATENT DOCUMENTS

| | | | | |
|---|---|---|---|---|
| 2004/0240669 | A1* | 12/2004 | Kempf et al. | 380/277 |
| 2006/0077908 | A1* | 4/2006 | Park et al. | 370/254 |
| 2007/0211678 | A1 | 9/2007 | Li et al. | |
| 2008/0075145 | A1* | 3/2008 | Balachandran et al. | 375/132 |
| 2009/0060200 | A1* | 3/2009 | Sheu et al. | 380/278 |
| 2009/0119407 | A1* | 5/2009 | Krishnan | 709/228 |
| 2010/0040042 | A1* | 2/2010 | van Greunen et al. | 370/350 |
| 2010/0191968 | A1* | 7/2010 | Patil et al. | 713/170 |
| 2011/0255557 | A1* | 10/2011 | Varadarajan et al. | 370/474 |
| 2012/0084568 | A1* | 4/2012 | Sarikaya et al. | 713/176 |
| 2013/0157706 | A1* | 6/2013 | Jo et al. | 455/512 |

FOREIGN PATENT DOCUMENTS

WO    WO 2010/017414    2/2010

OTHER PUBLICATIONS

Jun Luo et al: "Compressed Neighbor Discovery for Wireless Ad Hoc Networks: The Rayleigh Fading Case", 47th Annual Allerton Conf on IEEE, Sep. 30, 2009, pp. 308-313,XP031616571.
Jun Luo et al: "Neighbor Discovery in Wireless Ad Hoc Networks Based on Group Testing",46th Ann. Allerton Conf On, IEEE, Sep. 23, 2008, pp. 791-797, XP031435234.
Kodialam M. et al: "Identifying RFID Tag Categories In Linear Time" 7th Intl Symposium on Modeling & Optimization . . . IEEE, Jun 23-27, 2009, pp. 1-6, XP031573383.

(Continued)

*Primary Examiner* — Jung-Jen Liu
(74) *Attorney, Agent, or Firm* — J. K. Jacobs

(57) ABSTRACT

Various methods and devices are provided to address the need for improved neighbor detection. In a first method, a node (e.g., a mobile node or a network transceiver node) transmits (401) a neighbor discovery message that indicates a time at which neighbor discovery signaling is to occur. Then during the neighbor discovery signaling time, the node receives (402) signaling indicating a signature of at least one neighbor node. In a second method, a neighbor node receives (501) a neighbor discovery message that indicates a time at which neighbor discovery signaling is to occur. Then during the neighbor discovery signaling time, the neighbor node transmits (502) a signature identifying itself.

18 Claims, 5 Drawing Sheets

(56) References Cited

OTHER PUBLICATIONS

Natkaniec M et al: "PUMA—A New Channel Access Protocol for Wireless LANs", Wireless Personal Multimedia Comm, Oct. 27, 2002, pp. 1351-1355, XP010619314.

PCTUS2011/053706, Notification of Transmittal of the Intl Search Report and the Written Opinion of the Intl Searching Authority, or the Declaration.

* cited by examiner

METHOD AND APPARATUS FOR NEIGHBOR DISCOVERY

REFERENCE(S) TO RELATED APPLICATION(S)

The present application claims priority from a provisional application, Ser. No. 61/404,275, entitled "METHOD FOR WIRELESS NODE DETECTION," filed Sep. 30, 2010, which is commonly owned and incorporated herein by reference in its entirety.

FIELD OF THE INVENTION

The present invention relates generally to communications and, in particular, to node detection in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

Within the typical neighbor discovery framework, each mobile node periodically broadcasts Hello messages to advertise itself. These Hello messages enable nodes in a given vicinity to discover their neighbors and the link quality for links to them. However, neighbor discovery itself is not straightforward as one must deal with collisions. Typically, distributed schemes are desired as centralized schemes are not energy efficient, especially for networks with a large number of nodes. Commonly used schemes are probabilistic, where a node randomly exchanges messages with its neighbors. The efficiency of randomized schemes can be further improved by using synchronized time slots and receiver feedback information. Neighborhood discovery commonly relies on the assumption that the network forms a single clique where all nodes are within transmission range of each other. In addition, nodes are able to detect their neighbors individually by means of a unicast transmission.

Generally speaking, such neighbor detection schemes suffer from the following shortcomings
 1. Due to collisions, the presence of a mobile node may not be known to its neighbors.
 2. Even in the case that each node transmits multiple Hello messages, there is no deterministic time period in which the entire neighborhood detection is guaranteed.
 3. As a result of the above issues, determining the Wi-Fi neighborhood of a mobile node can take time on the order of seconds using such schemes. This process also disrupts ongoing communications.

Thus, new solutions and techniques that are able to address one or more of the issues encountered in neighbor detection would meet a need and advance wireless communications generally.

Figure 1:
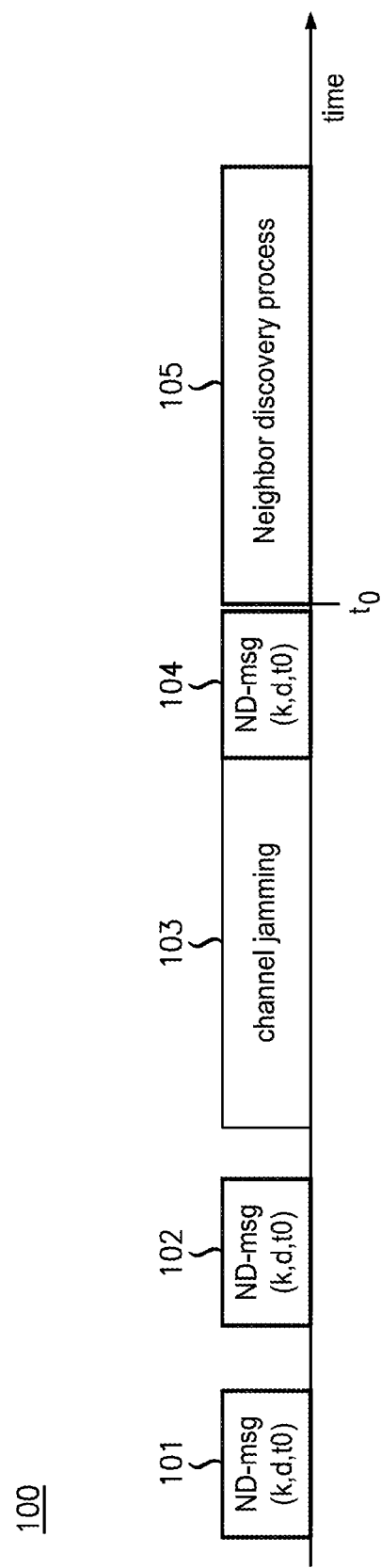
FIG. 1 is a block diagram depiction of signaling during a neighbor discovery process in accordance with various embodiments of the present invention.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods and devices are provided to address the need for improved neighbor detection. In a first method, a node (e.g., a mobile node or a network transceiver node) transmits a neighbor discovery message that indicates a time at which neighbor discovery signaling is to occur. Then during the neighbor discovery signaling time, the node receives signaling indicating a signature of at least one neighbor node. An article of manufacture is also provided, the article comprising a processor-readable storage medium storing one or more software programs which when executed by one or more processors performs the steps of this first method.

Many embodiments are provided in which this first method is modified. For example, in many embodiments the neighbor discovery message that is transmitted further indicates the size of the signature and/or the number of entries to be set in the signature to be transmitted during the neighbor discovery signaling time. In some embodiments, the node transmits one or more additional neighbor discovery messages that indicate the time at which neighbor discovery signaling is to occur, the size of the signature, and/or the number of entries to be set in the signature. In some embodiments, prior to the time at which neighbor discovery signaling is to occur on a channel, the node jams the channel. Furthermore, in some embodiments, the node transmits a neighbor discovery message after jamming the channel and just before the time at which neighbor discovery signaling is to occur.

In a second method, a node receives a neighbor discovery message that indicates a time at which neighbor discovery signaling is to occur. Then during the neighbor discovery signaling time, the node transmits a signature identifying itself. An article of manufacture is also provided, the article comprising a processor-readable storage medium storing one or more software programs which when executed by one or more processors performs the steps of this second method.

Many embodiments are provided in which this second method is modified. For example, in many embodiments the neighbor discovery message that is received further indicates the size of the signature and/or the number of entries to be set in the signature to be transmitted during the neighbor discovery signaling time. In many embodiments, the signature comprises a binary vector Vx of size k such that only d entries are set. Also, in many embodiments, transmitting the signature involves transmitting to indicate which signature entries are set. Depending on the embodiment, transmitting to indicate which signature entries are set involves transmitting noise to indicate which signature entries are set, and in some embodiments noise is transmitted in the time slot, sub-channel blocks that represent signature entries that are set. Also, in some embodiments, transmitting noise to indicate which signature entries are set involves not transmitting any signal in the time slot, sub-channel blocks that represent signature entries that are not set. Furthermore, in some embodiments, during the neighbor discovery signaling time, the node transmits noise over one or more pilots.

A node apparatus is also provided. The node being configured to communicate with other devices in the system and being operative to transmit a neighbor discovery message that indicates a time at which neighbor discovery signaling is to occur. The node is also operative to then receive, during the neighbor discovery signaling time, signaling indicating a signature of at least one neighbor node. Many embodiments are provided in which this node apparatus is modified. Examples of such embodiments can be found described above with respect to the first method.

A node apparatus is also provided. The node being configured to communicate with other devices in the system and being operative to receive a neighbor discovery message that indicates a time at which neighbor discovery signaling is to occur. The node is also operative to then transmit, during the neighbor discovery signaling time, a signature identifying itself. Many embodiments are provided in which this node apparatus is modified. Examples of such embodiments can be found described above with respect to the second method.

DETAILED DESCRIPTION OF EMBODIMENTS

Figure 2:
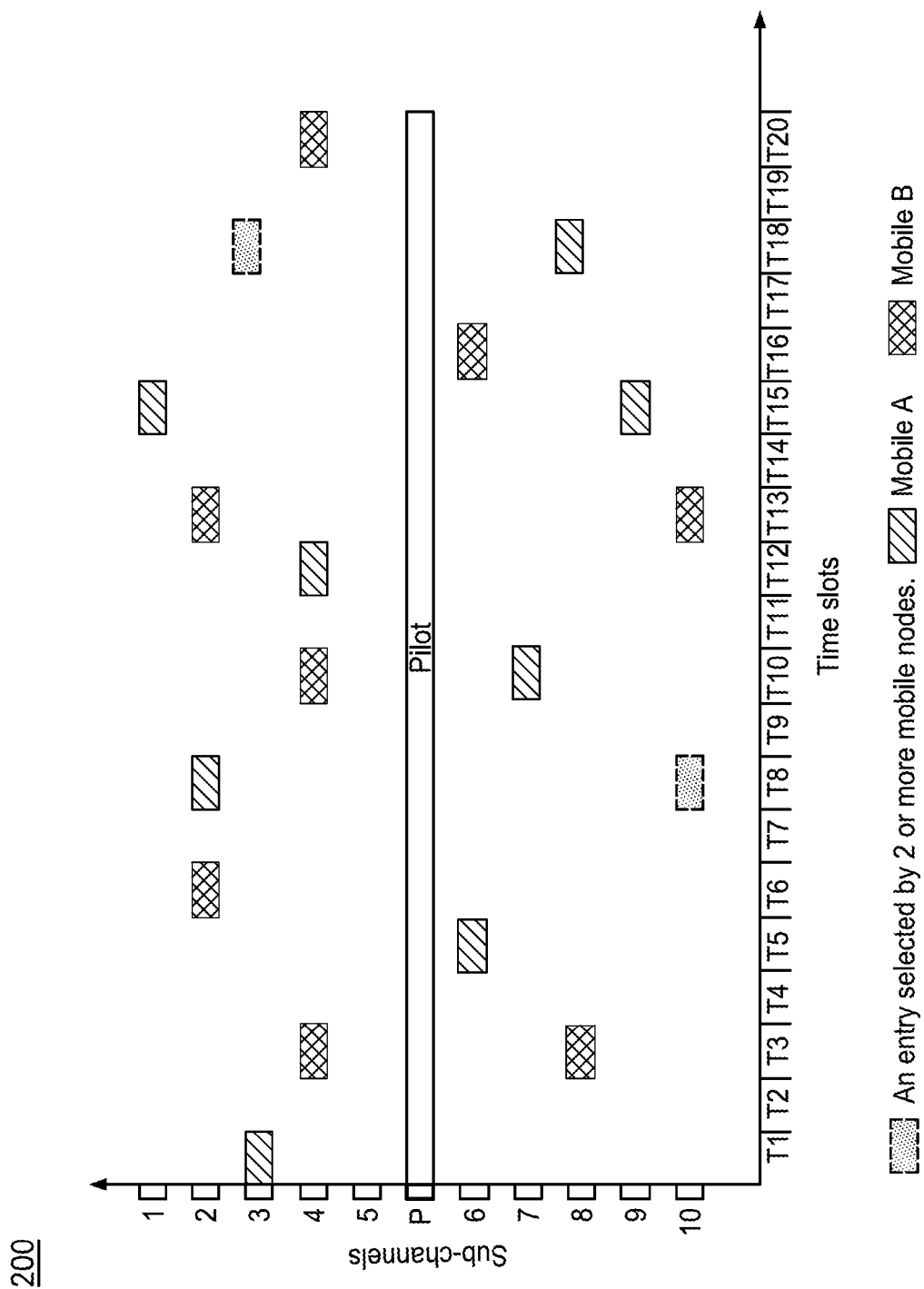
FIG. 2 is a block diagram depiction of signaling during a neighbor discovery process, in accordance with various embodiments of the present invention, in which only two neighboring mobiles are involved.
Figure 3:
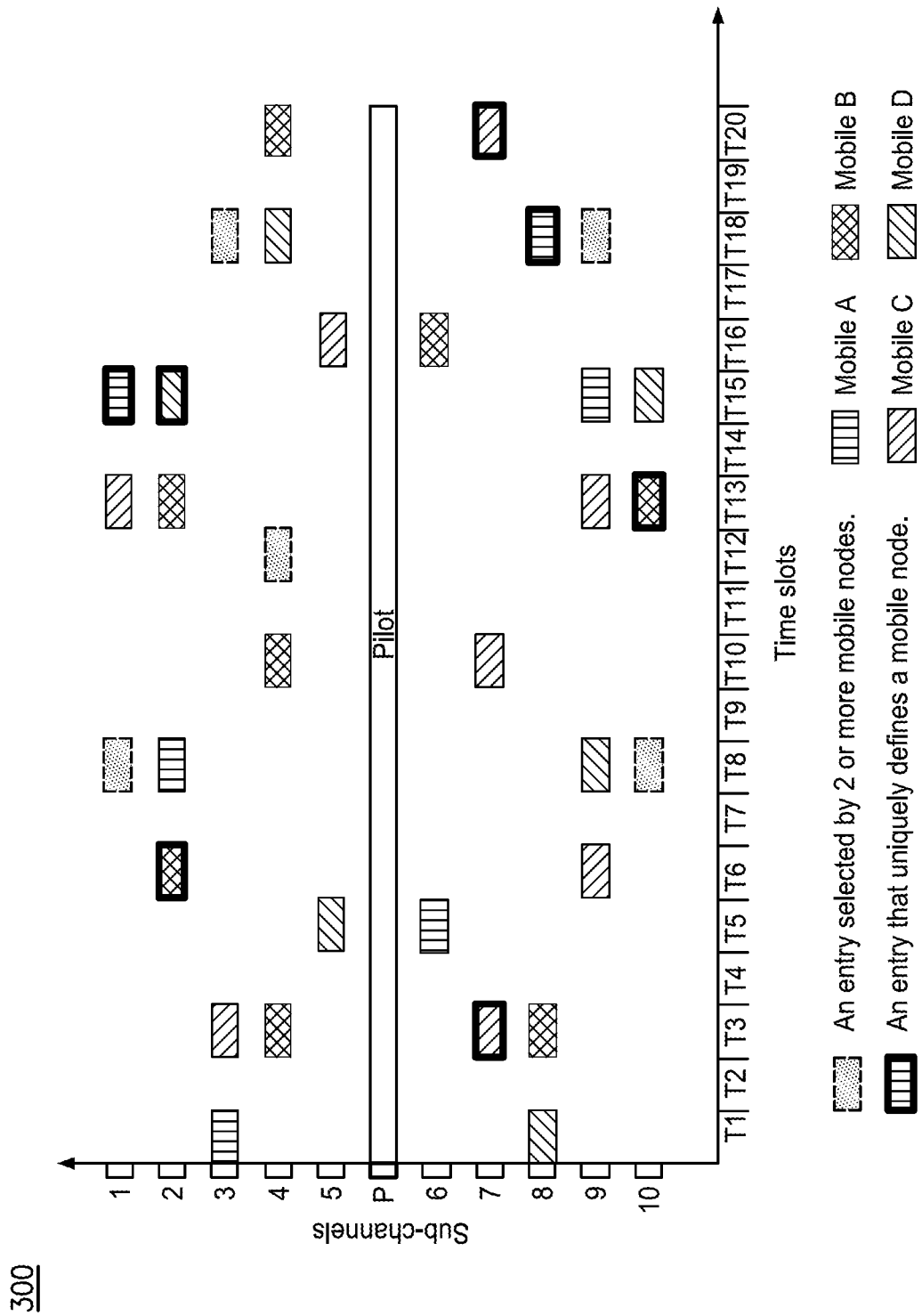
FIG. 3 is a block diagram depiction of signaling during a neighbor discovery process, in accordance with various embodiments of the present invention, in which many neighboring mobiles are involved (only selected entries of four mobiles are depicted).

To provide a greater degree of detail in making and using various aspects of the present invention, a description of our approach to neighbor detection and a description of certain, quite specific, embodiments follows for the sake of example. FIGS. 1-3 are referenced in an attempt to illustrate some examples of specific neighbor detection embodiments.

The goal of the approach described below is the fast detection of mobile nodes that are in the vicinity of a particular mobile node or Access Point (AP). It is believed that this detection can take on the order of 1 or 2 msec. depending on the embodiment and when conditions allow. In certain embodiments, the node detection methodology is implemented using an orthogonal frequency-division multiplexing (OFDM) based IEEE 802.11 protocol (such as IEEE 802.11-a/g/n). It is contemplated that in some embodiments, the node detection methodology will be applied in a system using a combination of cellular link resources and 802.11 interfaces. In such systems, it is desirable that both the network and mobile nodes know about the mobile nodes within their IEEE 802.11 transmission range (referred to as "node vicinity" or "Wi-Fi cell"). (It is noted that the term Wi-Fi is used herein to denote OFDM-based IEEE 802.11 networks.)

Consider, for example, a Wi-Fi network that contains mobile nodes that may or may not support the neighbor detection methodology described herein. The nodes that do not support this methodology cannot infer their presence and are ignored for the purpose of the present discussion. In this example, mobile nodes do not send their identities over the air interface; therefore, an assumption is made that mobile nodes either have a list of all node identities that may be located in their vicinity and support the neighbor detection methodology described herein or that mobile nodes are connected (via an AP or any other air interface) to a server that has this information.

Various embodiments of our neighbor detection methodology utilize a condensed sensing approach. See Kodialam, et al., "Identifying RFID tag categories in linear time," in WiOpt, 2009. (Referred to herein as [1].) Given a universe of N nodes, assume that at most m nodes are located in the neighborhood of any mobile node or AP. Moreover, assume that every node x is associated with a binary vector Vx of size k such that d bits (entries) are randomly selected to be set to '1' and the rest are set to '0'. The vector Vx of node x is referred to herein as the "signature" of node x. The condensed sensing approach is based on the following property:

Property 1: A node can identify all of the nodes in its neighborhood with probability (1−epsilon) by only knowing all the selected bits by the nodes in its vicinity, if k and d are chosen such that:

$$k >= 2.082 * m * \ln(N/\text{epsilon})$$

$$d = 1.44 * \ln(N/\text{epsilon})$$

The method works like a Bloom filter in the sense that, in order to verify if a node is present or not in a vicinity, one needs to query the d bits that the node would have selected had it been present. If all of those slots are 1, then the node is declared to be present. It is noted in [1] that the key difference from Bloom filters is that in Bloom filters the false positive rate of each queried node is epsilon, while in the approach of [1], the false positive rate is epsilon for identifying all m nodes. This approach is more suited to the purpose of neighbor detection, and therefore, will be utilized.

A way to implement the condensed sensing approach in OFDM-based, Wi-Fi networks is now described. A message transmission in an OFDM-based, Wi-Fi network is spread over b=48 orthogonal sub-channels (while 4 sub-channels are used as pilots). There are total of 52 sub-channels. Now consider a node x with signature Vx of size k. The signature Vx is divided into y=k/b sub-signatures denoted as S1, S2, ... Sy, each one with b bits. Thus, at any given time node x may transmit a sub-signature Si with b bits by spreading the sub-signature at the b different sub-channels, such that each bit is mapped to a single sub-channel. If this bit is/then node x sends noise on the corresponding sub channel, and if the bit is zero then node x does not transmit any signal.

Now consider, with reference to diagram 100 of FIG. 1, a node w interested in detecting the nodes in its vicinity. Node w selects a time instance t0 at which the neighborhood discovery process will start. Prior to time t0, node w sends several "neighbor discovery" messages (e.g., 101, 102) that indicate the time t0 as well as k and d. In addition just before t0, w jams the channel (103) so no other node transmits at time t0. Node w's transmission ends with a short message (104) to initiate the neighborhood detection process. Moreover, starting from time t0, the time is divided into slots of fixed known duration. We denote by T1, T2, T3, . . . , Ty the time period of every slot i, $1<=i<=y$. At every time slot Ti, every node x in the vicinity of node w (excluding w itself) transmits its sub-signature Si. Moreover, to ensure that all the nodes detect a busy channel (including the ones that do not support this neighborhood discovery process) every node x sends noise on the pilot sub-channels. During that time (105, from t0 until the end of the y-th time slot) node w listens to the channel and infers a vector R which represents the aggregated signatures of all the nodes in the vicinity of node w. Thus, by using Property 1, node w can infer all the nodes in its neighborhood.

Diagrams 200 and 300, in FIGS. 2 and 3, depict signaling in an OFDM-based, Wi-Fi network with only 11 sub-channels, one of which is used as a pilot (the sub-channel at the center of the given frequency band). Thus b=10. Moreover N, m and epsilon are assumed such that the calculated k and d are: k=200, d=10. Thus, the number of time slots is k/b=20. Since d=10, each mobile randomly selects 10 entries in the time-frequency matrix; then at each selected entry, the mobile transmits just noise. In diagram 200, the selected entries of the two mobiles are marked with different patterns for the sake of illustration. Moreover, entries that are selected by both mobiles are also indicated.

Diagram 300 is similar to diagram 200, with k=200, d=10, b=10 and using k/b=20 time slots. In diagram 300, we show that although the number of colliding transmissions is higher than that in diagram 200, every mobile has at least one entry that is not used by any other mobile in the given vicinity. These unique entries are critical to identifying the neighboring mobiles.

To demonstrate the usefulness of this approach, consider typical numbers seen in a very large cellular network or an enterprise network with $N=10^5$, epsilon=0.001, and m=100, i.e., there are at most 99 nodes within the Wi-Fi neighborhood of any node. With these numbers, one gets k=3835, d=26 bits. Now consider IEEE 802.11a or g with b=48, thus only k/b=3825/48=80 time slots are required for transmitting the signatures of all nodes in the vicinity of node w. Assume that every time slot has duration of one ODFM symbol which is 4 micro seconds. Consequently, the entire period of the signatures' transmissions is 4*80=320 micro seconds. For the sake of comparison, note that sending a single packet at a maximal bit-rate (data packet of 1500 bytes+ACK) over Wi-Fi also requires about 320 micro seconds. Given any additional overhead such as the messages sent by node w before time t0 one can conclude that the duration of the neighborhood discovery process is about 2-3 msec.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Figure 4:
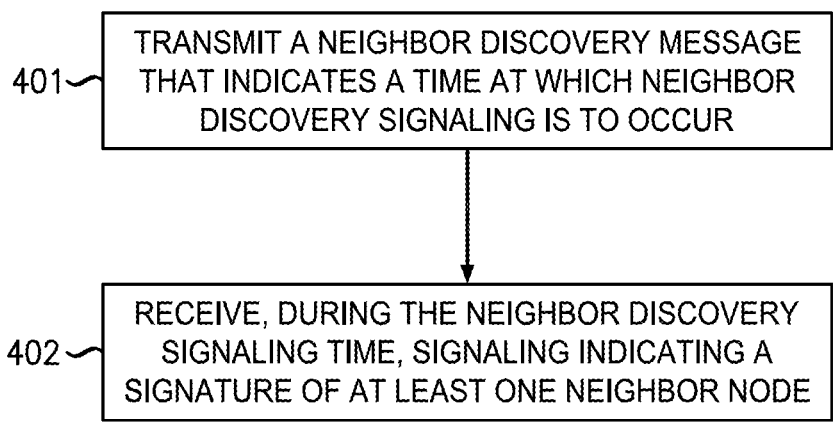
FIG. 4 is a logic flow diagram of functionality performed by a node initiating neighbor discovery in accordance with various embodiments of the present invention.
Figure 5:
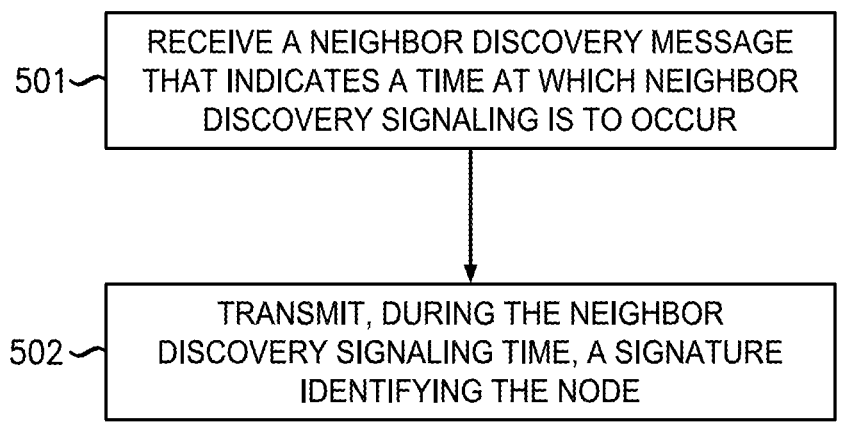
FIG. 5 is a logic flow diagram of functionality performed by a node participating in neighbor discovery in accordance with various embodiments of the present invention.

Aspects of embodiments of the present invention can be understood with reference to FIGS. 4 and 5. Diagram 400 of FIG. 4 is a logic flow diagram of functionality performed by a node initiating neighbor discovery, while diagram 500 of FIG. 5 is a logic flow diagram of functionality performed by a node participating in neighbor discovery. In the method depicted in diagram 400, an initiating node (e.g., a mobile node or a network transceiver node) transmits (401) a neighbor discovery message that indicates a time at which neighbor discovery signaling is to occur. In the method depicted in diagram 500, a neighbor node receives (501) the neighbor discovery message. Then during the neighbor discovery signaling time, the neighbor node transmits (502) a signature identifying itself. The initiating node receives (402) signaling indicating a signature of one or more nodes (for example, the neighboring node's signature).

Many embodiments are provided herein in which the methods and logic flows above may be modified. For example, in many embodiments the neighbor discovery message that is transmitted further indicates the size of the signature and/or the number of entries to be set in the signature to be transmitted during the neighbor discovery signaling time. In some embodiments, the initiating node transmits one or more additional neighbor discovery messages that indicate the time at which neighbor discovery signaling is to occur, the size of the signature, and/or the number of entries to be set in the signature. In some embodiments, prior to the time at which neighbor discovery signaling is to occur on a channel, the initiating node jams the channel. Furthermore, in some embodiments, the initiating node transmits a neighbor discovery message after jamming the channel and just before the time at which neighbor discovery signaling is to occur.

Furthermore, in many embodiments, transmitting the signature involves transmitting to indicate which signature entries are set. Depending on the embodiment, transmitting to indicate which signature entries are set involves transmitting noise to indicate which signature entries are set, and in some embodiments noise is transmitted in the time slot, sub-channel blocks that represent signature entries that are set. Also, in some embodiments, transmitting noise to indicate which signature entries are set involves not transmitting any signal in the time slot, sub-channel blocks that represent signature entries that are not set. Furthermore, in some embodiments, during the neighbor discovery signaling time, the neighbor node transmits noise over one or more pilots.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method of neighbor discovery, the method comprising:
   transmitting by a node a neighbor discovery message that indicates a time at which neighbor discovery signaling is to occur;
   receiving, by the node during the neighbor discovery signaling time, signaling indicating a signature of at least one neighbor node;
   receiving over at least one pilot, by the node during the neighbor discovery signaling time, signaling indicating a busy channel, wherein transmitting the neighbor discovery message comprises transmitting the neighbor discovery message to further indicate a number of entries to be set in a signature to be transmitted during the neighbor discovery signaling time.

2. The method as recited in claim 1, wherein transmitting the neighbor discovery message comprises
   transmitting the neighbor discovery message to further indicate a size of signature to be transmitted during the neighbor discovery signaling time.

3. The method as recited in claim 1, further comprising
   transmitting by the node at least one additional neighbor discovery message that indicates the time at which neighbor discovery signaling is to occur.

4. The method as recited in claim 1, further comprising
   jamming a channel by the node prior to the time at which neighbor discovery signaling is to occur on the channel.

5. The method as recited in claim 4, wherein transmitting the neighbor discovery message comprises
   transmitting the neighbor discovery message after jamming the channel and just before the time at which neighbor discovery signaling is to occur.

6. The method as recited in claim 1, wherein the node comprises one of a mobile node or a network transceiver node.

7. An article of manufacture comprising a non-transitory processor-readable storage medium storing one or more software programs which when executed by one or more processors performs the steps of the method of claim 1.

8. A method of neighbor discovery, the method comprising:
   receiving by a node a neighbor discovery message that indicates a time at which neighbor discovery signaling is to occur;
   transmitting, by the node during the neighbor discovery signaling time, a signature identifying the node;
   transmitting over at least one pilot, by the node during the neighbor discovery signaling time, signaling indicating a busy channel, wherein receiving the neighbor discovery message comprises receiving the neighbor discovery message that further indicates a number of entries to be set in a signature to be transmitted during the neighbor discovery signaling time.

9. The method as recited in claim 8, wherein receiving the neighbor discovery message comprises
   receiving the neighbor discovery message that further indicates a size of signature to be transmitted during the neighbor discovery signaling time.

10. The method as recited in claim 8, wherein the signature comprises binary vector $Vx$ of size k such that only d entries are set.

11. The method as recited in claim 10, wherein transmitting the signature comprises
    transmitting to indicate which signature entries are set.

12. The method as recited in claim 11, wherein transmitting to indicate which signature entries are set comprises
    transmitting noise to indicate which signature entries are set.

13. The method as recited in claim 12, wherein transmitting noise to indicate which signature entries are set comprises
    transmitting noise in the time slot, sub-channel blocks that represent signature entries that are set.

14. The method as recited in claim 13, wherein transmitting noise to indicate which signature entries are set comprises
    not transmitting any signal in the time slot, sub-channel blocks that represent signature entries that are not set.

15. The method as recited in claim 8, wherein transmitting signaling indicating a busy channel comprises
    transmitting, by the node during the neighbor discovery signaling time, noise over at least one pilot.

16. An article of manufacture comprising a non-transitory processor-readable storage medium storing one or more software programs which when executed by one or more processors performs the steps of the method of claim 8.

17. A node of a communication system, the node being configured to communicate with other devices in the system, wherein the node is operative
    to transmit a neighbor discovery message that indicates a time at which neighbor discovery signaling is to occur,
    to receive, during the neighbor discovery signaling time, signaling indicating a signature of at least one neighbor node, and
    to receive over at least one pilot, during the neighbor discovery signaling time, signaling indicating a busy channel, wherein being operative to transmit the neighbor discovery message comprises being operative to transmit the neighbor discovery message to further indicate a number of entries to be set in a signature to be transmitted during the neighbor discovery signaling time.

18. A node of a communication system, the node being configured to communicate with other devices in the system, wherein the node is operative
    to receive a neighbor discovery message that indicates a time at which neighbor discovery signaling is to occur,
    to transmit, during the neighbor discovery signaling time, a signature identifying the node, and to transmit over at least one pilot, during the neighbor discovery signaling time, signaling indicating a busy channel, wherein being operative to receive the neighbor discovery message comprises being operative to receive the neighbor discovery message that further indicates a number of entries to be set in a signature to be transmitted during the neighbor discovery signaling time.

* * * * *